April 26, 1966  L. O. BALKE  3,247,917
VEHICLE AXLE SCALE WITH BEAM LINKED TO LEAF SPRING SHACKLES
Filed Nov. 10, 1964  2 Sheets-Sheet 1

Lorenzo O. Balke
INVENTOR.

BY *Clarence A. O'Brien*
and *Harvey B. Jackson*
Attorneys

April 26, 1966 L. O. BALKE 3,247,917
VEHICLE AXLE SCALE WITH BEAM LINKED TO LEAF SPRING SHACKLES
Filed Nov. 10, 1964 2 Sheets-Sheet 2
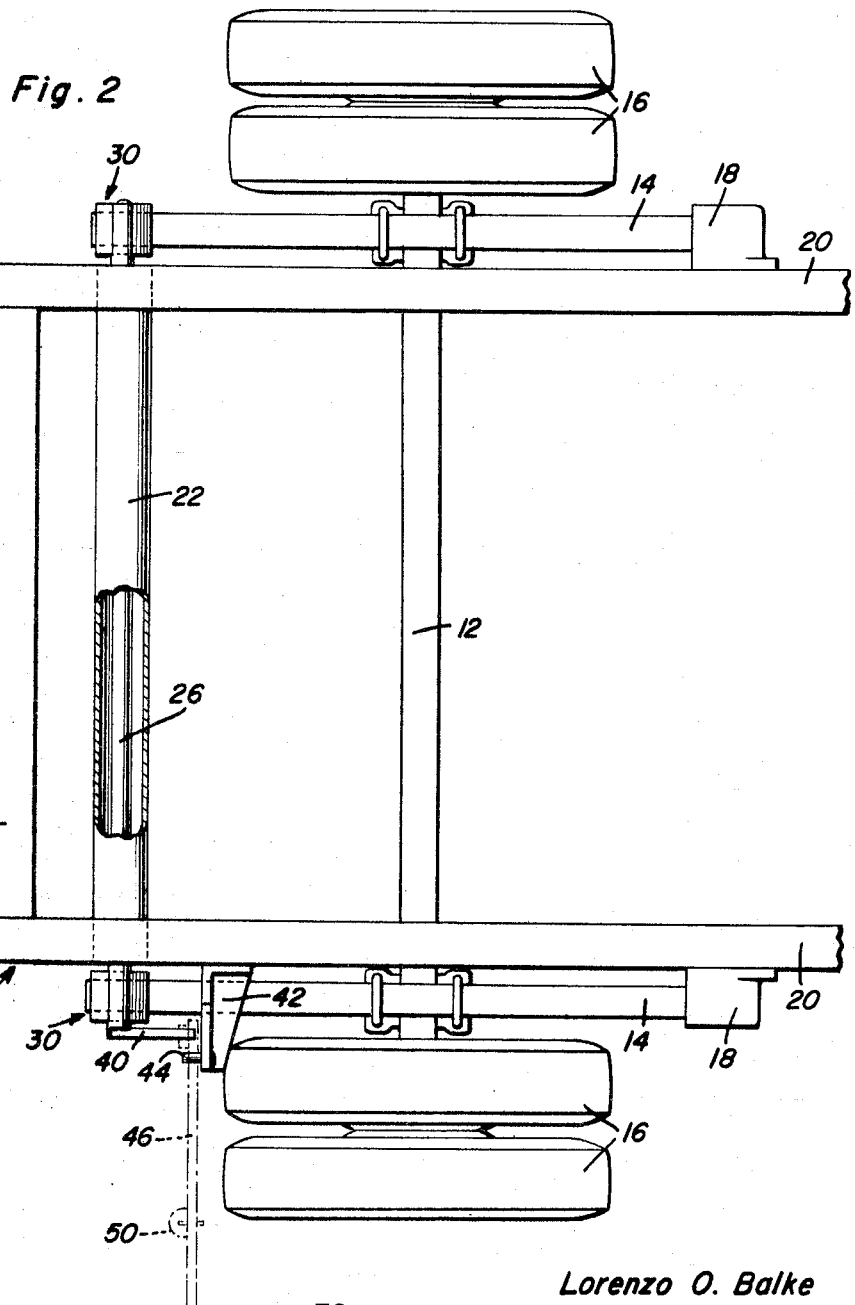
Lorenzo O. Balke
INVENTOR.

United States Patent Office 3,247,917
Patented Apr. 26, 1966

3,247,917
VEHICLE AXLE SCALE WITH BEAM LINKED TO LEAF SPRING SHACKLES
Lorenzo O. Balke, Rte. 3, Shawano, Wis.
Filed Nov. 10, 1964, Ser. No. 410,223
9 Claims. (Cl. 177—137)

This invention generally relates to new and useful improvements in load indicators particularly for motor vehicles and has for its primary object to provide, in a manner as hereinafter set forth, novel means for indicating the weight of a load on a vehicle as the loading operation progresses as well as for weighing the entire load after the operation has been completed.

Another highly important object of the present invention is to provide an improved vehicle load scale comprising few relatively moving parts for a minimum of friction, thus assuring maximum accuracy.

Still another important object is to provide a vehicle load scale of the aforementioned character which will be accurate even though the load and the vehicle may be unbalanced.

Another object is to provide a vehicle load scale of the character set forth comprising a pivoted beam which may be readily removed when the scale is not in use, as during transit.

Other objects are to provide an improved vehicle load scale which is comparatively simple in construction, strong, durable, compact, of light weight and which may be manufactured and installed at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a top plan view thereof with a portion broken away in section, the beam being shown in dotted lines;

FIGURE 6 is a detailed view in perspective of the adjustable arm and beam connecting link; and FIGURE 7 is a perspective view of another form of beam.

Figure 1:
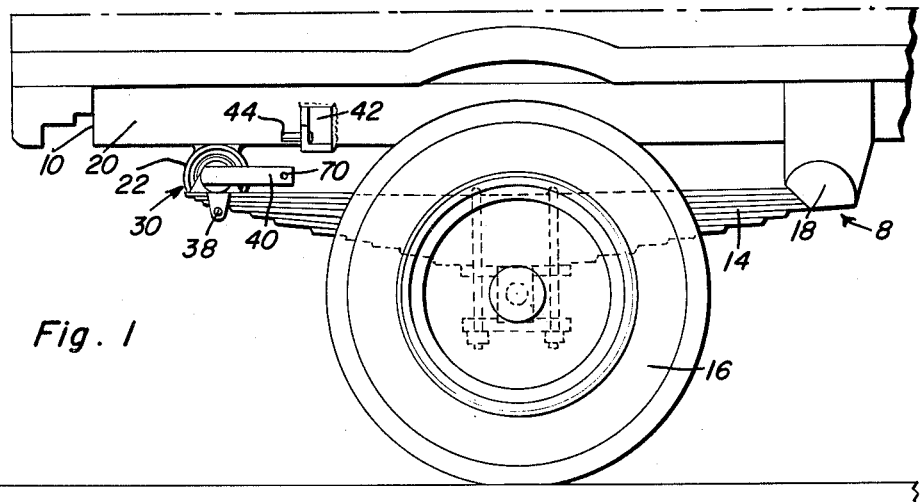
FIGURE 1 is a view in side elevation of the rear portion of a vehicle equipped with a scale embodying the present invention, the beam being omitted.

Referring now to the drawing in detail, it will be seen that the reference numeral 8 generally designates the rear end portion of a wheeled vehicle. The vehicle 8 includes a frame 10 mounted on a rear axle 12 by means comprising leaf springs 14, together with wheels 16 on said axle. As usual, the forward ends of the springs 14 are connected at 18 to the side members 20 of the frame 10.

A tubular housing 22 of suitable metal is fixedly mounted transversely beneath the rear end portion of the frame 10, said tubular housing being affixed as at 24 to the side members 20. A shaft 26 is rotatably journalled in the housing 22 and projects beyond the ends thereof. Roller bearings 28 are provided for the shaft 26 in the housing 22.

Fixedly mounted on the projecting end portions of the shaft 26 are spring shackles or saddles 30 of suitable metal. The shackles 30 comprise, in the embodiment shown, generally triangular blocks or the like 32 having formed in their upper portions substantially cylindrical seats 34 which fixedly receive the end portions of the shaft 26. The base portions or undersides of the blocks 32 rest on the rear end portions of the springs 14. Ears 36 depend from the blocks 32 and straddle the springs 14. Bolts or pins 38 extend between the ears 36 beneath the springs 14 for retaining the shackles 30 thereon.

Fixedly mounted on one end of the shaft 26 is a vertically swingable arm 40. Projecting from the adjacent side member 20 of the frame 10, adjacent the free end of the arm 40, is a bracket 42. A pin 44 projects rearwardly from the outer portion of the bracket 42. A removable beam 46 is pivotally mounted for vertical swinging movement on the pin 44. The beam 46 comprises a suitable scale 48. A weight 50 is mounted for adjustment on the beam 46 and cooperable with the scale 48. Formed integrally with the inner or pivoted end of the beam 46 is a pointer 52 which is cooperable with an indicating scale or indicia 54 on the bracket 42.

An adjustable link 56 operatively connects the arm 40 to the beam 46 inwardly of the pivot pin 44. As illustrated to advantage in FIGURE 6 of the drawing, the link 56 includes a tubular, internally threaded upper section 58 having affixed to its upper portion a right angularly extending pin 60 which is pivotally engaged in an opening 62 provided therefor in the beam 46. The link 56 further comprises an adjustable lower section which includes a shank 64 which is threadedly engaged in the tube 58. A locknut 66 secures the adjustment. Extending right angularly from the lower end of the shank 64 is a pin or the like 68 which is removably engaged in an opening 70 provided therefor in the free end portion of the arm 40.

Figure 3:
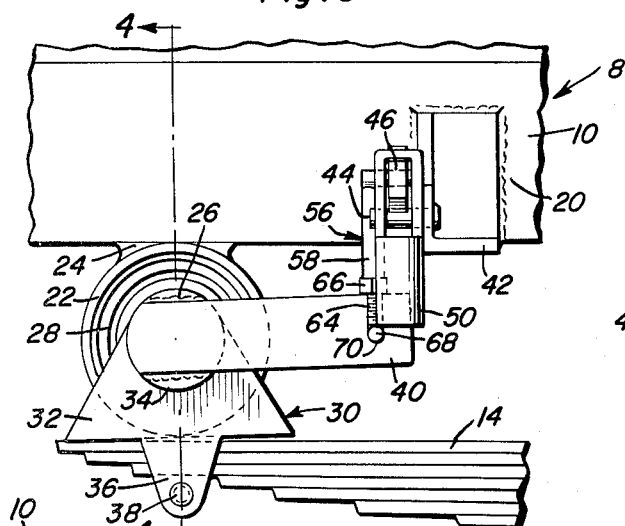
FIGURE 3 is an enlarged view in side elevation of the scale.
Figure 4:
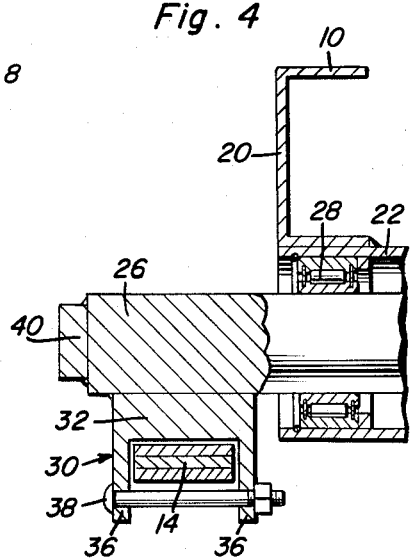
FIGURE 4 is a view principally in vertical section, taken substantially on the line 4—4 of FIGURE 3.

It is felt that the operation of the scale will be readily apparent from a consideration of the foregoing. As the vehicle is loaded, blocks 32 move downwardly with the resultant downward deflection of the springs 14 to the position of FIGURE 1 of the drawings rotating the shaft 26 counterclockwise relative to the frame 10, thus swinging the arm 40 upwardly. Then, the beam 46 is mounted on the pin 44 and connected to the arm 40 by means of the adjustable link 56. At this time, the pointer 52 will be below the indicia 54 and the weight of the free end of the beam 46 will cause further upward swinging movement of the arm 40 thereby rocking the blocks counterclockwise relative to the springs 14 and depressing the rear ends of the loaded springs 14. By thereafter adding the weight 50 to the beam 46 the blocks will be further rocked in counterclockwise directions to the position illustrated in FIGURE 3 of the drawings at which point the pointer 52 will be registered with the indicia 54. Thus, the indicated load on the frame 10 determined by the weight and position of the weight 50 on the beam 46 is actually the result of a measurement of the force required to downwardly deflect the rear ends of the loaded springs 14 a predetermined amount, such required force varying as the load on the springs 14 is varied.

Figure 5:
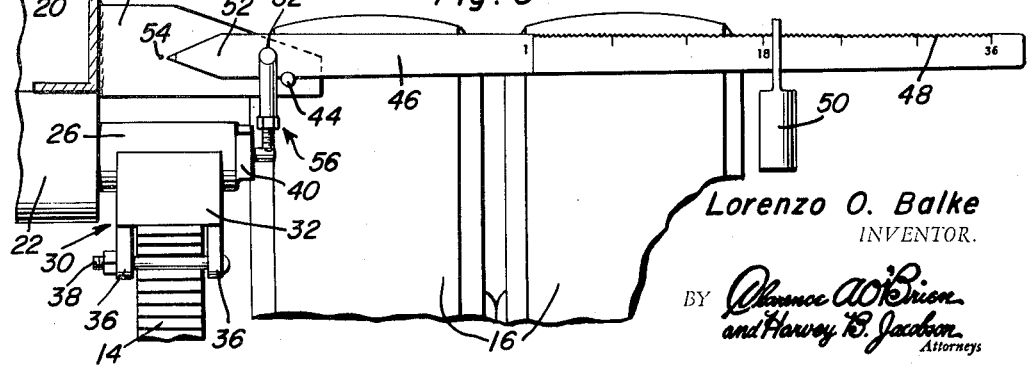
FIGURE 5 is a rear elevational view.

For weighing heavy loads a multiple beam 72 (see FIGURE 7) may be provided. In the embodiment shown, the beam 72 comprises a plurality of spaced, parallel scales 74 each of which is to be provided with a suitable adjustable weight (not shown). In other respects this form of the invention is substantially similar in construction and operation to the embodiment of FIGURE 5 of the drawing.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A vehicle comprising a frame, leaf springs having one end connected to said frame, supporting wheels on said springs, a shaft rotatably mounted on the frame, a load scale including a beam pivotally mounted on the frame, means operatively connecting the shaft to the other end portions of the springs for supporting the frame thereon and for rotating said shaft in response to movement of said frame relative to said springs, and means operatively connecting the shaft to the beam.

2. A vehicle comprising a frame, leaf springs having one end connected to said frame, supporting wheels on said springs, a shaft rotatably mounted on the frame, a load scale including a beam pivotally mounted on the frame, means operatively connecting the shaft to the other end portions of the springs for supporting the frame thereon and for rotating said shaft in response to movement of said frame relative to said springs, and means operatively connecting the shaft to the beam, the second-named means including an arm affixed to the shaft, and a link operatively connecting said arm to the beam.

3. A vehicle comprising a frame, leaf springs having one end connected to said frame, supporting wheels on said springs, a shaft rotatably mounted on the frame, a load scale including a beam pivotally mounted on the frame, means operatively connecting the shaft to the other end portions of the springs for supporting the frame thereon and for rotating said shaft in response to movement of said frame relative to said springs, and means operatively connecting the shaft to the beam, the first-named means comprising shackles including blocks affixed to the shaft and resting on the springs.

4. A vehicle comprising a frame, leaf springs having one end connected to said frame, supporting wheels on said springs, a shaft rotatably mounted on the frame, a load scale including a beam pivotally mounted on the frame, means operatively connecting the shaft to the other end portions of the springs for supporting the frame thereon and for rotating said shaft in response to movement of said frame relative to said springs, and means operatively connecting the shaft to the beam, the second-named means including an arm affixed to the shaft, a link operatively connecting said arm to the beam, the first-named means comprising shackles including blocks affixed to the shaft and resting on the springs.

5. The combination of claim 3, said shackles further including ears depending from the blocks on opposite sides of the springs.

6. The combination of claim 5, said shackles still further including retaining bolts extending between the ears beneath the springs for connecting the blocks thereto.

7. The combination of claim 6, together with a fixed tubular housing on the frame rotatably receiving the shaft.

8. The combination of claim 2, said link being adjustable and including threadedly connected male and female sections, and angularly extending pins on said sections pivotally engaged in the arm and the beam.

9. The combination of claim 8, said beam comprising a plurality of spaced, parallel scales.

References Cited by the Examiner

UNITED STATES PATENTS

| | | | |
|---|---|---|---|
| 1,402,606 | 1/1922 | Hemingway | 177—136 |
| 1,581,211 | 4/1926 | Hofmann | 177—137 |
| 2,687,285 | 8/1954 | Fisher | 177—136 X |

LEO SMILOW, *Primary Examiner.*